(12) United States Patent
Rush et al.

(10) Patent No.: US 11,952,101 B2
(45) Date of Patent: Apr. 9, 2024

(54) ASSEMBLY AND METHOD CONNECTING AN AIRCRAFT WING AFT SPAR ROOT TO AN AIRCRAFT BODY FUSELAGE

(71) Applicant: The Boeing Company, Chicago, IL (US)

(72) Inventors: Michael R. Rush, Mukilteo, WA (US); Orion P. Watson, Kirkland, WA (US); Daniel H. Fletcher, Lake Forest Park, WA (US); Ryan A. Fear, Kirkland, WA (US); Brent E. Beneke, Mukilteo, WA (US); David H. Leibov, Seattle, WA (US); Patricia W. Estell, Woodinville, WA (US); Norma L Alvarez-Quinones, Seattle, WA (US); Soo H. Teoh, Mill Creek, WA (US); Jesse R. Wiseman, Snohomish, WA (US); Mark E. Shadell, Seattle, WA (US); Mark R. Mclaughlin, Snohomish, WA (US); Emmett A. Salisbury, Everett, WA (US)

(73) Assignee: The Boeing Company, Chicago, IL (US)

( * ) Notice: Subject to any disclaimer, the term of this patent is extended or adjusted under 35 U.S.C. 154(b) by 122 days.

(21) Appl. No.: 17/685,961

(22) Filed: Mar. 3, 2022

(65) Prior Publication Data
US 2022/0281582 A1 Sep. 8, 2022

Related U.S. Application Data

(60) Provisional application No. 63/157,327, filed on Mar. 5, 2021.

(51) Int. Cl.
*B64C 1/26* (2006.01)
*B64C 1/06* (2006.01)
(Continued)

(52) U.S. Cl.
CPC .................. *B64C 1/26* (2013.01); *B64F 5/10* (2017.01); *B64C 1/064* (2013.01); *B64C 3/185* (2013.01)

(58) Field of Classification Search
CPC .. B64C 1/00; B64C 1/26; B64C 1/064; B64C 3/185; B64F 5/10
See application file for complete search history.

(56) References Cited

U.S. PATENT DOCUMENTS 5,518,208 A * 5/1996 Roseburg ................ B64C 1/064
244/119
2008/0283666 A1 11/2008 Grieve et al.
(Continued)

FOREIGN PATENT DOCUMENTS

EP        3632790 A1      4/2020
WO   WO-2007071905 A1 *  6/2007  ............... B64C 1/12
WO      2008105805 A2    9/2008

*Primary Examiner* — Brady W Frazier
*Assistant Examiner* — Peter A Taraschi
(74) *Attorney, Agent, or Firm* — Quinn IP Law

(57) ABSTRACT

An assembly integrates an aft wing spar root fitting to an aircraft fuselage when joining the aircraft wing to the aircraft body. The assembly provides structural strength to the connection between the aircraft wing and the aircraft body, provides corrosion prevention and provides improved inspection capabilities and repair capabilities to the aircraft wing and aircraft body connection.

15 Claims, 8 Drawing Sheets

(51) Int. Cl.
*B64C 3/18* (2006.01)
*B64F 5/10* (2017.01)

(56) References Cited

U.S. PATENT DOCUMENTS

| | | | |
|---|---|---|---|
| 2009/0173826 A1* | 7/2009 | Estell | B64C 1/26 244/131 |
| 2011/0024557 A1* | 2/2011 | Brighton | B64C 25/24 244/102 R |
| 2020/0108908 A1* | 4/2020 | Cominsky | B64F 5/10 |

* cited by examiner

ASSEMBLY AND METHOD CONNECTING AN AIRCRAFT WING AFT SPAR ROOT TO AN AIRCRAFT BODY FUSELAGE

CROSS-REFERENCE TO RELATED APPLICATION(S)

This application claims the benefit of U.S. Provisional Application Ser. No. 63/157,327 filed Mar. 5, 2021, the entire content of which is hereby incorporated by reference.

FIELD

This disclosure pertains to an assembly that connects an aircraft wing to an aircraft body. More specifically, this disclosure pertains to an assembly that integrates an aft wing spar root fitting to an aircraft fuselage when joining the aircraft wing to the aircraft body. The assembly provides structural strength to the connection between the aircraft wing and the aircraft body, provides corrosion prevention and provides improved inspection capabilities and repair capabilities to the aircraft wing and aircraft body connection.

BACKGROUND

The integration or connection of an aircraft wing to an aircraft body for composite material designs of aircraft is challenging in terms of satisfying structural strength requirements, providing corrosion prevention, facilitating the building or assembly of the aircraft wing to the aircraft body and meeting requirements for inspection and repairability of the connection between the aircraft wing and the aircraft body. The typical metallic connection architecture between the aft wing spar root fitting and the aircraft body fuselage is difficult to manufacture and often results in peaking loads transferred between a composite spar of the aircraft wing and the composite skin of the aircraft fuselage.

SUMMARY

The assembly and method of this disclosure for connecting an aircraft wing to an aircraft body facilitates the building process of integrating and fitting an aft wing spar root of an aircraft wing to a fuselage of an aircraft body. The assembly allows an improved load path from the aircraft wing to the aircraft body and thereby reduces the overall weight of the assembly structure. Several features of the assembly enable easy inspection at critical joints between the aircraft wing and the aircraft body. Improved joints of the assembly allow fay seal application during assembly for corrosion protection at supporting fay seal surfaces.

The assembly connects the root of an aft wing spar of an aircraft wing to the fuselage of the aircraft body. The assembly includes a trap panel. The trap panel or panel is connected between the aft wing spar root and a wheel well longeron on the aircraft fuselage.

The trap panel has a panel forward edge that is directed toward the forward end of the length of the aircraft fuselage. The panel forward edge has a forward edge surface that extends along the panel forward edge.

The trap panel also has a panel top that is oriented toward the top of the aircraft fuselage. A panel top flange is integrally connected to the panel top. The panel top flange has a panel top surface or a top flange surface that extends along the top flange. The panel top surface or top flange surface is generally aligned with the length of the aircraft fuselage.

The trap panel also has a panel bottom that is oriented toward the bottom of the aircraft fuselage. A panel bottom flange or a trap panel lower horizontal flange is integrally connected to the panel bottom. The panel bottom flange has a panel bottom surface or a bottom flange surface that extends along the panel bottom flange. The panel bottom surface or bottom flange surface is generally aligned with the length of the aircraft fuselage.

A wing rear spar terminal fitting is secured to the rear spar of the aircraft wing. The terminal fitting is secured to the inboard end or root end of the aircraft wing. A rearward extending aft flange is part of the terminal fitting. The terminal fitting also comprises an outboard flange that extends at an angle outwardly or in an outboard direction from the aft flange. The outboard flange is secured to the wing rear spar. The terminal fitting also includes an inboard flange. The inboard flange extends at an angle inwardly or in an inboard direction from the outboard flange and from the aft flange.

The assembly also includes a side fitting. The side fitting is connected to a center wing box spar on the aircraft body and to the terminal fitting. The side fitting is secured to the terminal fitting aft flange and to the center wing box spar on the aircraft body. The side fitting has a base configured for or shaped to fit flat against the center wing box spar. The side fitting has an inboard flange and an outboard flange on opposite sides of the base of the side fitting. The inboard flange and the outboard flange both extend rearwardly from opposite sides of the base. A horizontally oriented stiffener flange extends rearwardly from a top of the base.

The assembly also includes a main landing gear up-lock fitting or an up-lock fitting on the trap panel. The up-lock fitting is integrally formed into reinforcing ribs that are integral with the inboard surface of the trap panel. A bushing connects a main landing gear of the aircraft to the up-lock fitting.

The trap panel top surface or the panel top flange surface is positioned opposing a bottom surface on the aircraft body. The top panel is secured to the bottom surface. The bottom surface of the aircraft body is on a wheel well longeron of the fuselage.

In using the assembly in connecting or assembling an aircraft wing to an aircraft body, the aircraft wing is first moved toward the aircraft body. The movement of the aircraft wing toward the aircraft body positions the forward edge surface of the trap panel on the aircraft body opposite the rearward edge surface on the terminal fitting aft flange on the aircraft wing.

The trap panel bottom surface or the panel bottom flange surface is positioned opposing a top surface of a rearward extending plate or a lower splice plate on the aircraft wing. The rearward extending plate extends rearward from the root of the aft wing spar.

There is a gap between the trap panel bottom flange surface and the top surface of the rearward extending splice plate. The gap has an inboard portion of the gap and an outboard portion of the gap on opposite sides of the gap. The inboard portion of the gap tapers as the inboard portion of the gap extends into the gap. The outboard portion of the gap tapers as the outboard portion of the gap extends into the gap.

A shim is inserted into the gap between the trap panel bottom surface or panel bottom flange surface and the top surface of the rearward extending splice plate on the aircraft wing. The shim is comprised of an inboard shim and a separate outboard shim. A fay sealant is applied to the surfaces of the inboard shim and the inboard shim is inserted into the inboard portion of the gap. A fay sealant is applied to the surfaces of the outboard shim and the outboard shim is inserted into the outboard portion of the gap. The trap panel bottom flange is then secured to the rearward extending splice plate.

There is a forward connection connected to the trap panel and connected to the terminal fitting aft flange on the wing. The forward connection connects the panel to the aft flange. The forward connection is comprised of a forward splice plate, or a plurality of forward splice plates. The forward splice plate or the plurality of forward splice plates are engaged in surface engagement with the panel and are connected to the panel, and are engaged in surface engagement with the aft flange and are connected to the aft flange. The plurality of forward splice plates are spatially arranged at positions along the trap panel forward edge surface and are spatially arranged at positions along the rearward edge surface of the aft flange. The plurality of forward splice plates connected to the panel and connected to the aft flange provide a first load path between the aircraft wing and the aircraft fuselage.

The trap panel has a panel side surface positioned adjacent the panel forward edge. The forward splice plate or the plurality of forward splice plates are connected to the panel on the panel side surface. The trap panel has exposed surface areas on the panel side surface adjacent the panel forward edge surface and between adjacent forward splice plates of the plurality of forward splice plates. The panel exposed surface areas provide means for inspection of the trap panel side surface at the panel exposed surface areas.

The terminal fitting aft flange has a flange side surface adjacent the rearward edge surface of the aft flange. The forward splice plate or the plurality of forward splice plates are connected to the aft flange on the flange side surface. The aft flange side surface has exposed surface areas on the aft flange adjacent the rearward edge surface of the aft flange. The flange exposed surface areas are between adjacent forward splice plates of the plurality of forward splice plates spatially positioned along the rearward edge surface of the aft flange. The flange exposed surface areas provide means for inspection of the aft flange exposed surface areas.

An upper connection is connected between the trap panel and the bottom surface of the aircraft body. The upper connection is comprised of an upper splice plate or a plurality of upper splice plates. The plurality of upper splice plates are spatially positioned along the panel top surface or along the panel top flange surface and along the bottom surface of the aircraft body. The upper splice plate or plurality of upper splice plates are engaged in surface engagement with the panel or panel side surface and are connected to the panel, and the upper splice plate or plurality of upper splice plates are engaged in surface engagement with the aircraft body and are connected to the aircraft body. The upper connection provided by the upper splice plate or the plurality of upper splice plates connects the panel to the aircraft body or connects the panel to the bottom surface of the aircraft body.

The trap panel has panel exposed surface areas on the panel side surface adjacent the panel top flange and between adjacent upper splice plates of the plurality of upper splice plates. The panel exposed surface areas provide means for inspection of the panel side surface at the panel exposed surface areas.

The features, functions, and advantages that have been discussed can be achieved independently in various embodiments or may be combined in yet other embodiments, further details of which can be seen with reference to the following description and drawings.

DETAILED DESCRIPTION

Figure 1:
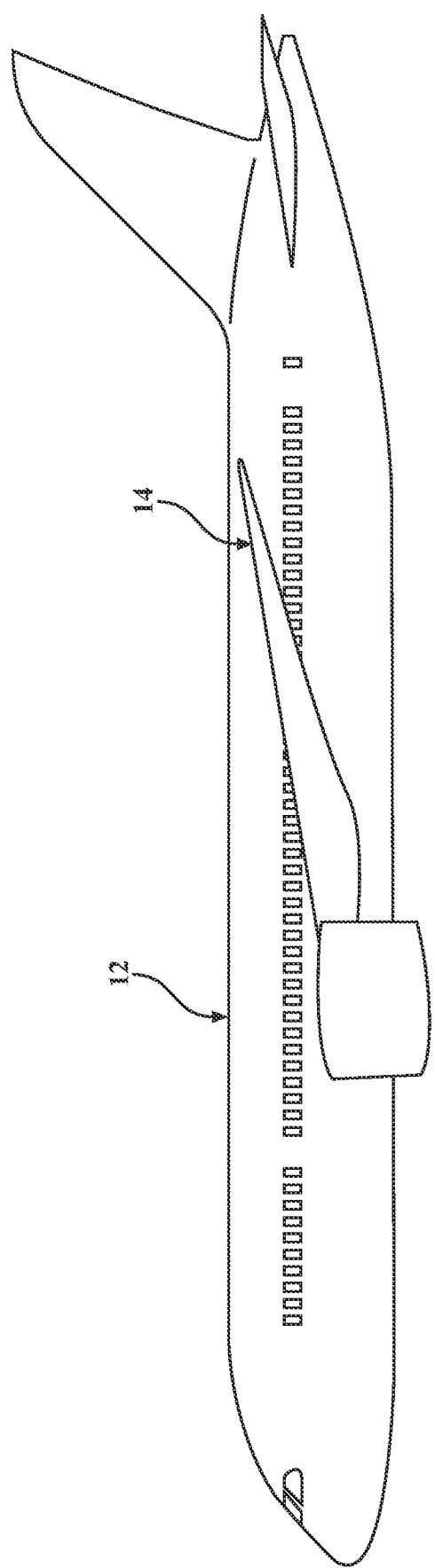
FIG. 1 is a representation of a side elevation view of the left side or port side of an aircraft.

FIG. 1 is a representation of a side elevation view of the port side or left side of an aircraft body 12 with the port side or left side aircraft wing 14 joined to the side of the aircraft body 12. Although the assembly connecting the aircraft wing 14 to the aircraft body 12 to be described refers to the connection of the left side or port side aircraft wing 14 to the aircraft body 12, it should be understood that the concepts of the assembly are equally well applicable to the connection of the starboard side or right side aircraft wing to the aircraft body. The assembly and method of this disclosure for connecting the aircraft wing 14 to the aircraft body 12 facilitates the building process of integrating and fitting an aft wing spar root of the aircraft wing 14 to the fuselage of the aircraft body 12. The assembly allows improved load paths from the aircraft wing 14 to the aircraft body 12 and thereby reduces the overall weight of the assembly structure. Several features of the assembly enable easy inspection at critical joints between the aircraft wing 14 and the aircraft body 12. Improved joints of the assembly allow fay seal application during assembly of the aircraft wing 14 to the aircraft body 12 for corrosion protection at supporting fay seal surfaces.

Figure 2:
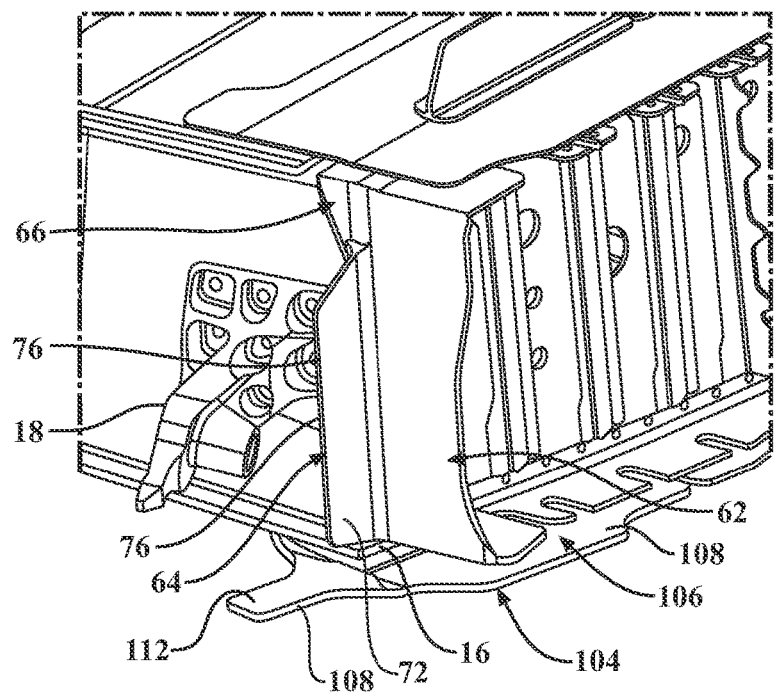
FIG. 2 is a representation of a partial view of a state of assembly of an interior construction of the aft spar and root end of the aircraft wing prior to the wing to body join represented in FIG. 1.
Figure 3:
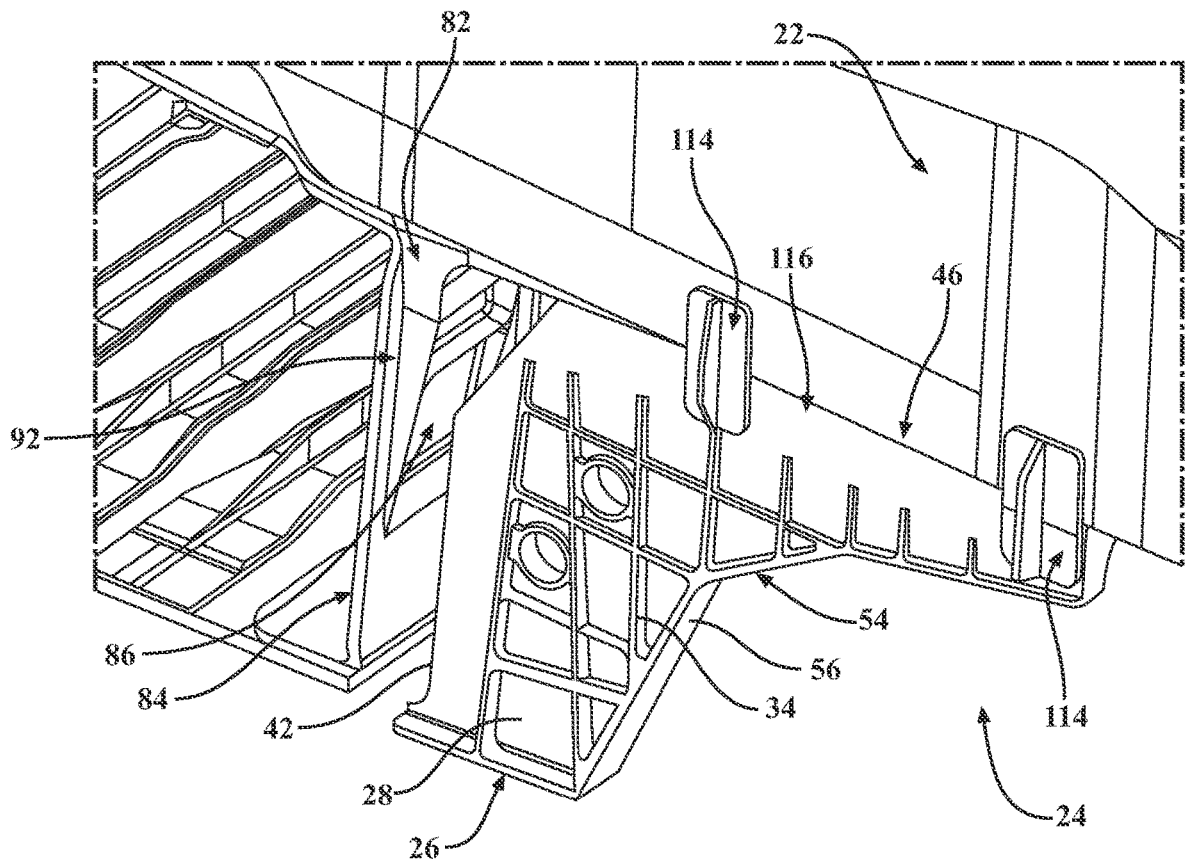
FIG. 3 is a representation of a partial view of a state of assembly of the interior construction of the fuselage in the side of the body of the aircraft prior to the wing to body join represented in FIG. 1.

Referring to FIGS. 2 and 3, FIG. 2 shows a representation of the root end or inboard end 16 of the aft wing spar 18, or rearward wing spar. FIG. 3 is a representation of an outboard portion of the fuselage 22 and the outboard end 24 of the aircraft wheel well to which the root end of the aft wing spar 16 represented in FIG. 2 is joined. As represented in FIG. 3, the assembly connecting the aircraft wing 14 to the aircraft body 12 includes a trap panel or a panel 26. The panel 26 is represented in FIG. 3 as connected to the aircraft fuselage 22. The outboard side of the panel 26 is represented in FIG. 3.

Figure 4:
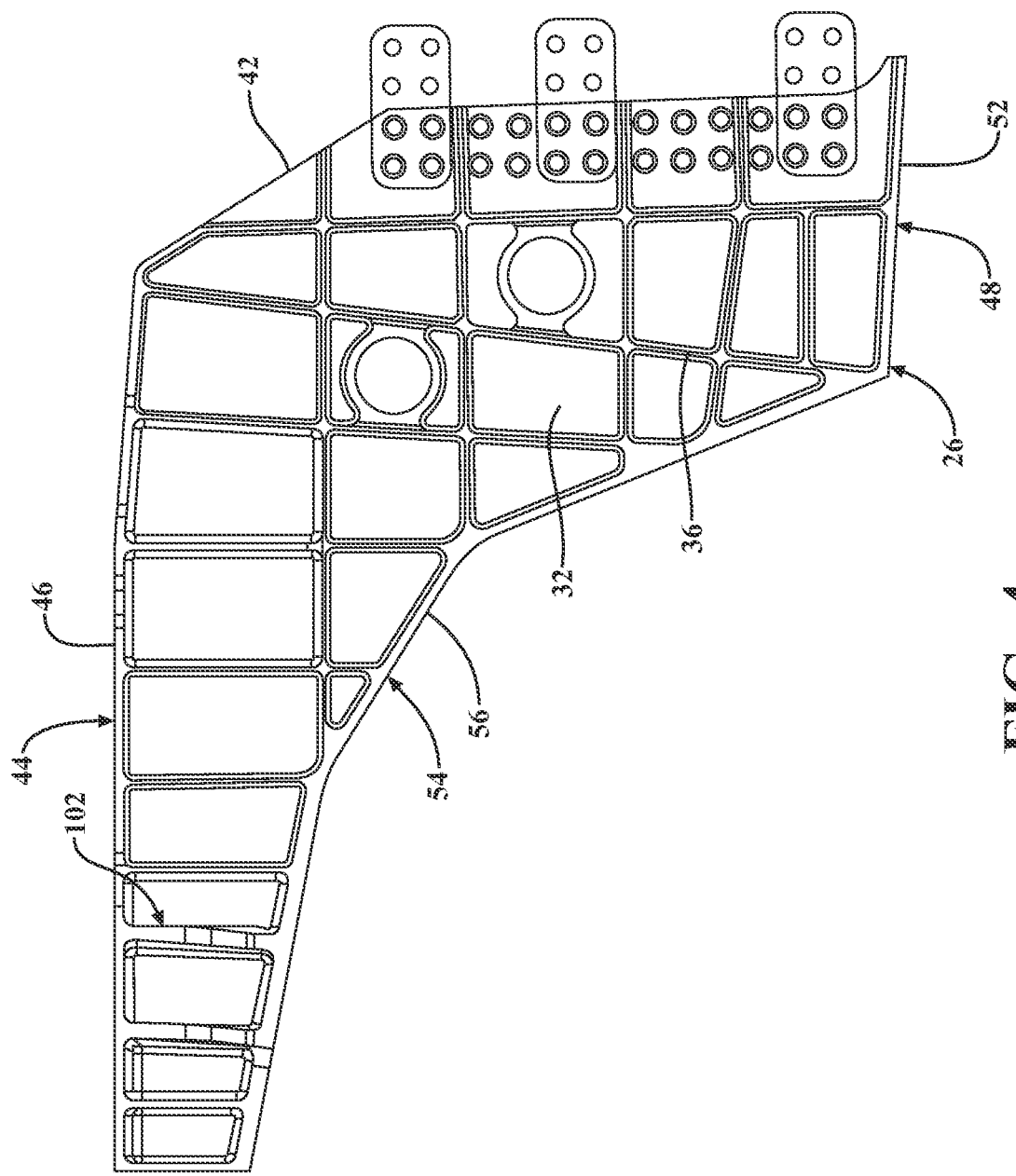
FIG. 4 is a representation of an elevation view of an inboard side of the trap panel represented in FIG. 3.

FIG. 4 is a representation of the inboard side of the panel 26 removed from the fuselage 22. The panel 26 is often referred to as a "trap" panel due to its general trapezoidal configuration. The panel 26 is typically constructed as one, monolithic piece of aluminum to reduce cost. However, other equivalent materials could be employed in constructing the panel 26. The panel 26 has a planar, outboard side surface 28 represented in FIG. 3, and an opposite, planar, inboard side surface 32 represented in FIG. 4. A thickness dimension of the panel 26 is substantially constant between the outboard side surface 28 and the inboard side surface 32. A plurality of outboard stiffener ribs 34 arranged in a grid pattern are formed integrally on the outboard side surface 28 of the panel 26. A plurality of inboard stiffener ribs 36 arranged in a grid pattern are formed integrally on the inboard side surface 32 of the panel 26. The stiffener ribs 34, 36 add rigidity to the panel 26 and strengthen the panel.

The panel 26 has a panel forward edge that is directed toward the forward end of the length of the aircraft fuselage. The panel forward edge has a forward edge surface 42. The forward edge surface 42 has a thickness dimension that is substantially the same as the thickness dimension of the panel 26 between the outboard side surface 28 and the inboard side surface 32 of the panel.

The panel 26 has a top that is oriented toward the top of the aircraft fuselage of the aircraft body 12. A panel top flange 44 is integrally connected to the top of the panel 26. The panel top flange 44 projects outwardly from the inboard side surface 32 of the panel 26, but does not project outwardly from the outboard side surface 28 of the panel 26. The panel top flange 44 is oriented at a perpendicular orientation or at a right angle relative to the inboard side surface 32 of the panel 26. The panel top flange 44 has a panel top surface 46 or a top flange surface 46 that extends along the panel top flange 44. The panel top flange surface 46 is generally aligned with the length of the aircraft fuselage.

The panel 26 has a bottom that is oriented toward the bottom of the aircraft fuselage of the aircraft body 12. A panel bottom flange 48 is integrally connected to the bottom of the panel 26. The panel bottom flange 48 projects outwardly from the outboard side surface 28 of the panel 26 and from the inboard side surface 32 of the panel 26. The panel bottom flange 48 is oriented at an angle relative to the outboard side surface 28 and the inboard side surface 32 of the panel 26. The panel bottom flange 48 has a panel bottom surface or bottom flange surface 52 that extends along the panel bottom flange 48. The panel bottom flange surface 52 is generally aligned with the length of the aircraft fuselage.

The panel 26 has a rearward end that is directed toward the rearward end of the length of the aircraft fuselage. A panel rearward flange 54 is integrally connected to the rearward end of the panel 26. The panel rearward flange 54 extends between the panel top flange 44 and the panel bottom flange 48. The panel rearward flange 54 is continuous with the panel top flange 44 and the panel bottom flange 48. The panel rearward flange 54 projects outwardly from the outboard side surface 28 of the panel 26 and from the inboard side surface 32 of the panel 26. The panel rearward flange 54 is oriented at an angle relative to the outboard side surface 28 of the panel 26 and the inboard side surface 32 of the panel 26. The panel rearward flange 54 has a panel rearward surface 56 or a rearward flange surface 56 that extends along the panel rearward flange 54.

Figure 6:
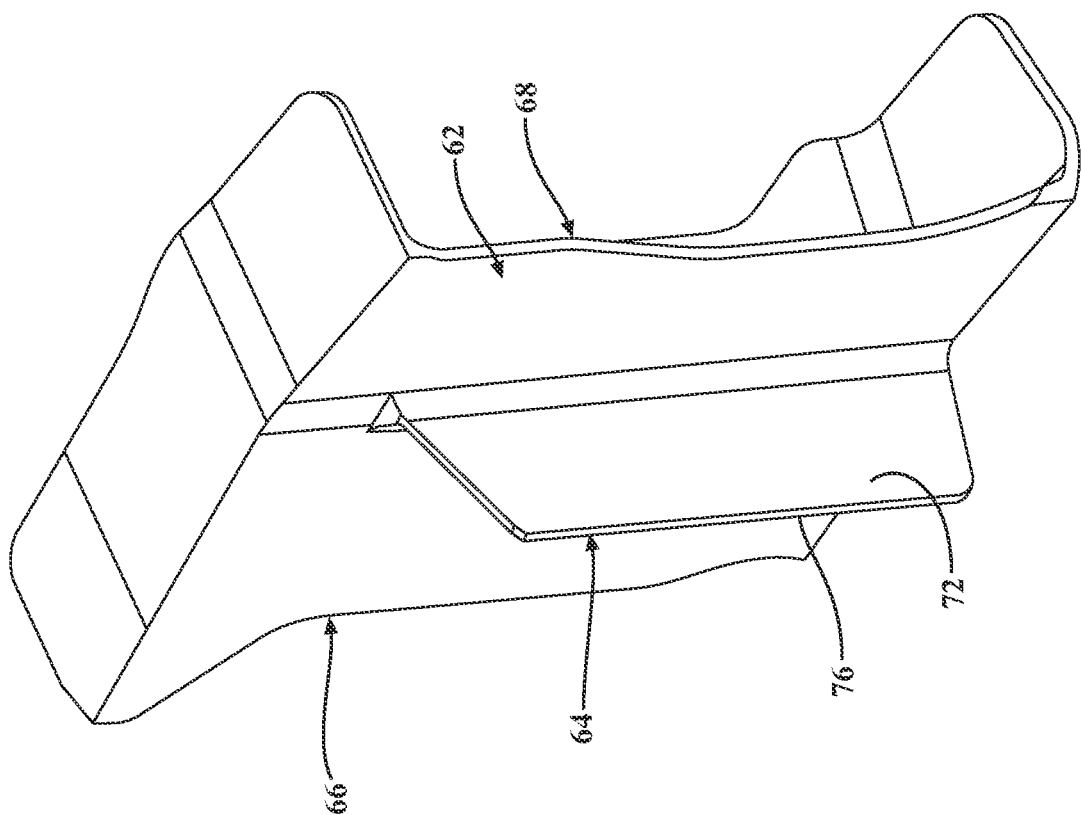
FIG. 6 is a representation of a perspective view of the wing rear spar terminal fitting removed from the wing as represented in FIG. 2.

The assembly connecting the aircraft wing 14 to the aircraft body 12 also includes a terminal fitting 62 or a wing rear spar terminal fitting 62. The terminal fitting 62 is represented in FIG. 2 as attached to the aft wing spar 18 at the inboard, root end of the aircraft wing 14. The terminal fitting 62 is represented in FIG. 6 as removed from the aft wing spar 18. The terminal fitting 62 is constructed of a strong metal, for example titanium. Other equivalent materials could be used to construct the terminal fitting 62. Composite materials could also be used to construct the terminal fitting 62.

Figure 9:
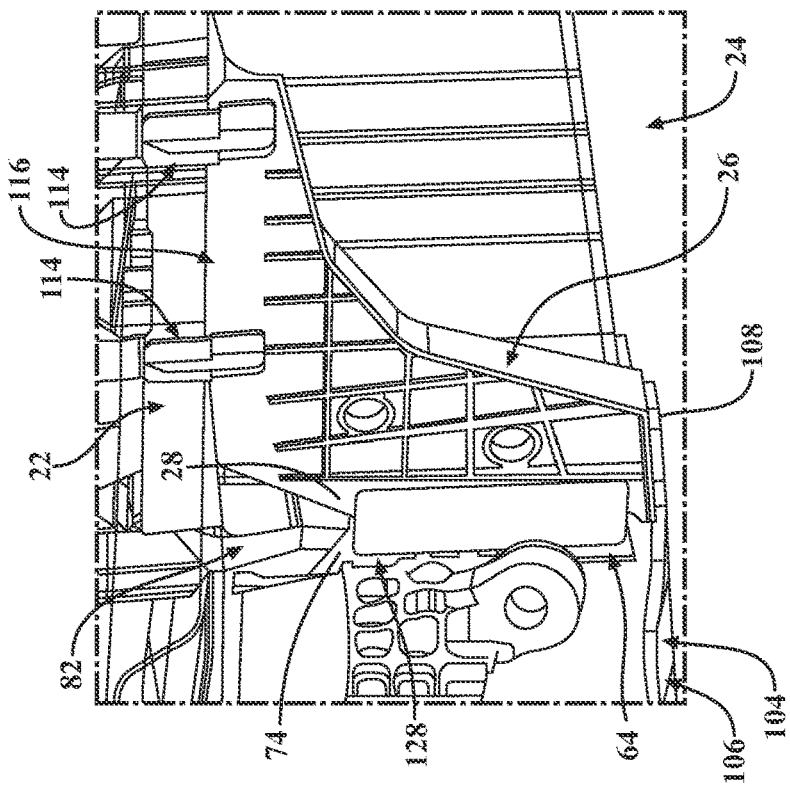
FIG. 9 is a representation of a partial view of an outboard side of a connection between the aft spar of the wing root of FIG. 2 and the fuselage of FIG. 3.

The terminal fitting 62 has a rearward extending flange, or aft flange 64. With the terminal fitting 62 connected to the aircraft wing 14, the aft flange 64 extends in a rearward direction relative to the aircraft body 12. The terminal fitting 62 also includes an outboard flange 66. The outboard flange 66 extends outwardly or in an outboard direction from the aft flange 64. As represented in FIG. 2, the outboard flange 66 is secured to the inboard end of the aft wing spar 16 by fasteners, or by other equivalent means. The terminal fitting 62 also includes an inboard flange 68. The inboard flange extends inwardly or in an inboard direction from the aft flange 64. When the aircraft wing 14 is secured to the aircraft body 12, the inboard flange 68 is secured to the aircraft fuselage. In this disclosure, when the aircraft wing 14 is secured to the aircraft body 12, the inboard flange 68 of the terminal fitting 62 is secured by fasteners or by other equivalent means to an aft spar of the center wing box of the aircraft fuselage. As represented in FIGS. 2, 6, 8 and 10, the aft flange 64 of the terminal fitting 62 has a planar, inboard side surface 72. As represented in FIG. 9, the aft flange 64 of the terminal fitting 62 has a planar, outboard side surface 74. A thickness dimension of the aft flange 64 is substantially constant between the outboard side surface 74 and the inboard side surface 72 of the aft flange 64.

The aft flange 64 has a flange rearward edge that is directed toward the rearward end of the length of the aircraft fuselage. The flange rearward edge has a rearward edge surface 76. The aft flange rearward edge surface 76 has a thickness dimension that is substantially the same as the thickness dimension of the aft flange 64 between the outboard side surface 74 and the inboard side surface 72 of the aft flange 64.

Figure 7:
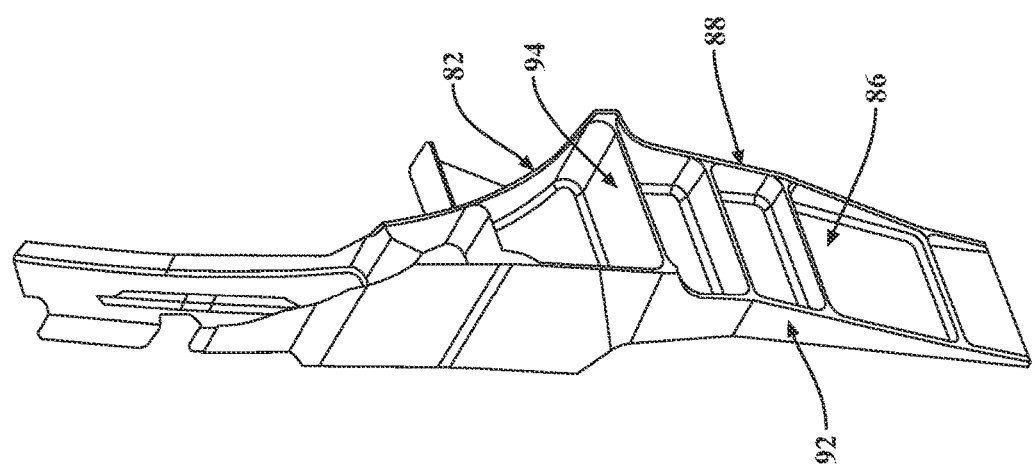
FIG. 7 is a representation of a perspective view of the rear spar side fitting removed from the fuselage as represented in FIG. 3.
Figure 10:
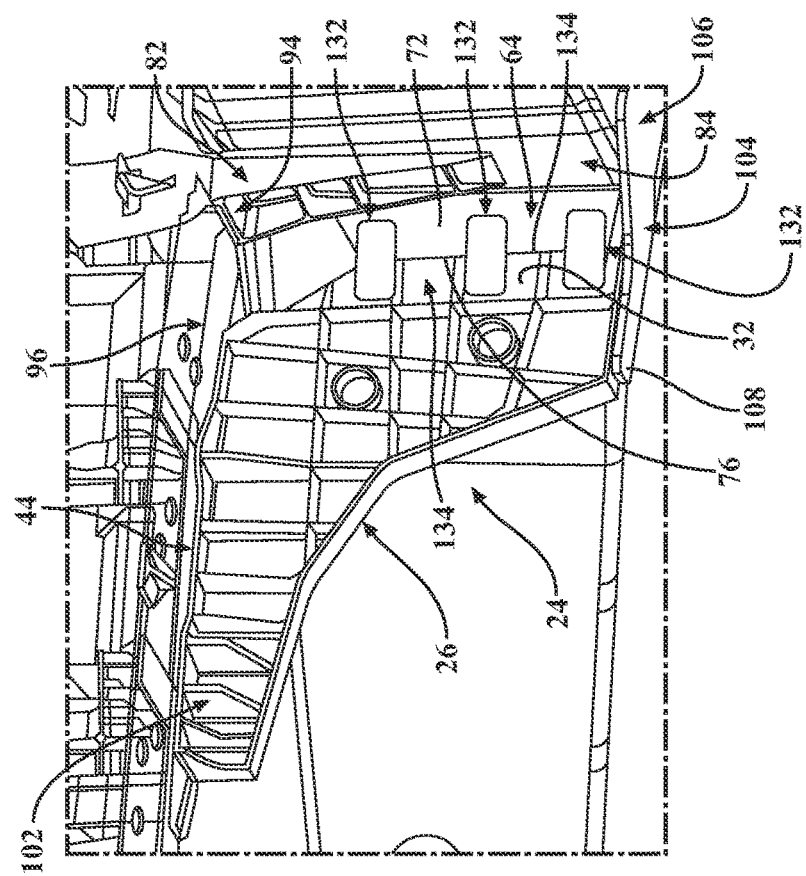
FIG. 10 is a representation of a partial view of the inboard side of a connection between the aft spar of the wing root of FIG. 2 and the fuselage of FIG. 3.
Figure 11:
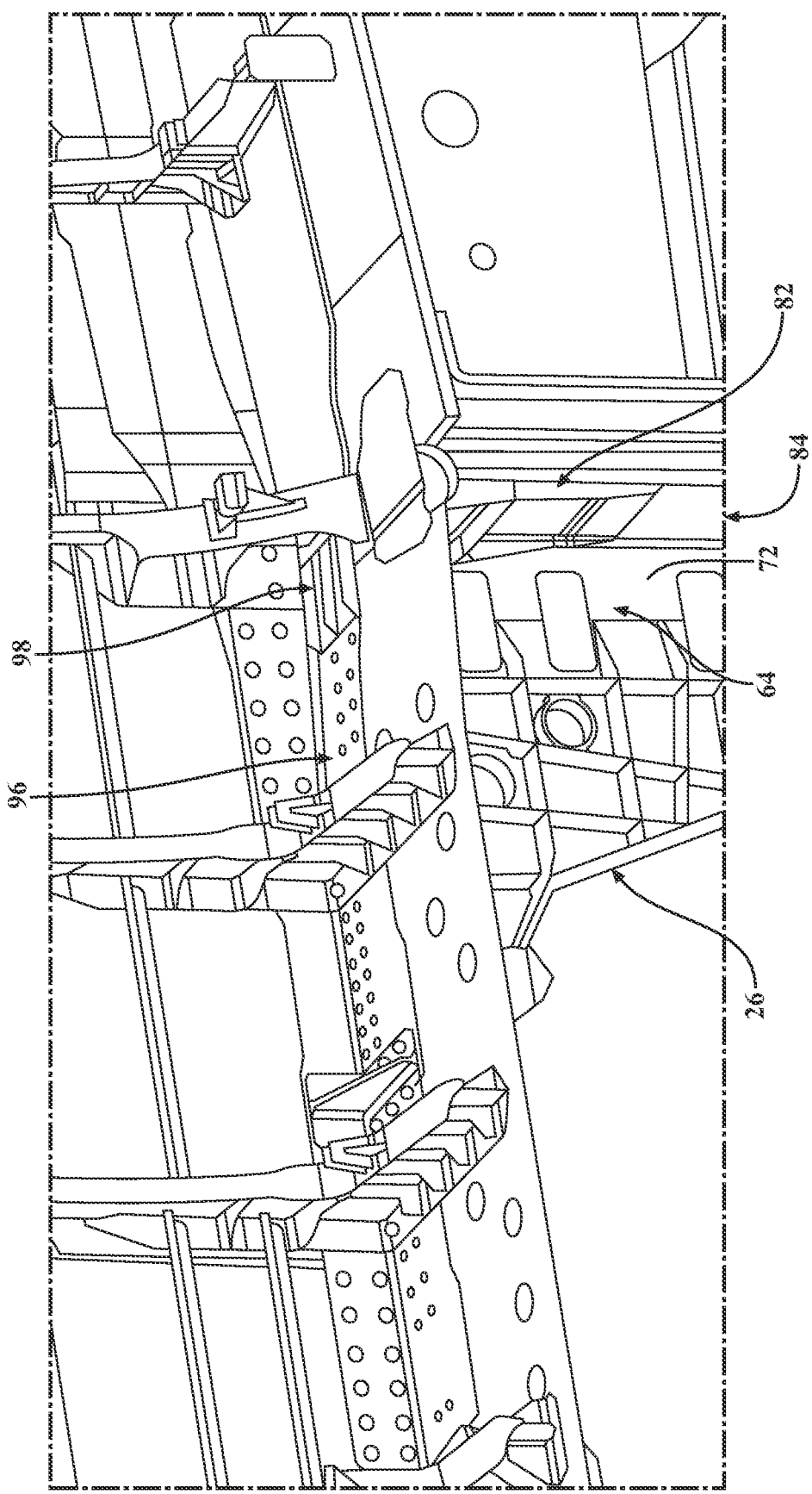
FIG. 11 is a representation of a partial view of the inboard side of the connection between the rear spar side fitting of FIG. 7 and a wheel well longeron of the aircraft fuselage.

The assembly also includes a side fitting 82 or a rear spar side fitting 82. The side fitting 82 is represented secured by fasteners or other equivalent means to the aircraft fuselage in FIG. 3 and FIG. 11. FIG. 3 and FIG. 11 represent the side fitting 82 secured by fasteners or other equivalent means to an aft spar 84 of the center wing box. FIG. 7 is a representation of the side fitting 82 removed from the aft spar 84 of the center wing box of the aircraft fuselage. As represented in FIG. 7, the side fitting 82 has a base 86 that is configured or shaped to fit in a vertical orientation flat against the aft spar 84 of the center wing box. A vertically oriented inboard flange 88 and a vertically oriented outboard flange 92 extend rearwardly from opposite sides of the side fitting base 86. The side fitting 82 has a stiffener flange 94 or a stiffener 94 that extends rearwardly from a top of the base 86. The stiffener flange 94 is horizontally oriented relative to the base 86. As represented in FIGS. 3, 9 and 10, the side fitting stiffener flange 94 or side fitting stiffener 94 aligns with and is positioned in a same plane as a horizontal flange of the aircraft body. As represented in FIG. 10, the side fitting stiffener 94 is aligned with and positioned in a same horizontal plane as a longeron flange 96 of a wheel well longeron 96.

As represented in FIG. 11, a splice plate 98 is connected by fasteners to both the stiffener flange 94 of the side fitting 82 and to the wheel well longeron flange 96. The splice plate 98 connected between the side fitting 82 and the wheel well longeron flange 96 provides a second, separate load path between the aircraft wing 14 and the fuselage of the aircraft body 12.

The assembly also includes a main landing gear up-lock fitting 102 or an up-lock fitting 102 on the trap panel 26. As represented in FIGS. 4 and 10, the up-lock fitting 102 is integrally formed into the reinforcing inboard stiffener ribs 36 that are integral with the inboard side surface 32 of the trap panel 26. A bushing (not shown) connects a main landing gear (not shown) to the up-lock fitting 102. The up-lock fitting 102 being integrally formed with the trap panel 26 provides a direct load path from the main landing gear into the body of the aircraft and reduces the number of parts required for the connection of the main landing gear to the aircraft body 12, thereby saving weight and improving integration space.

Figure 5:
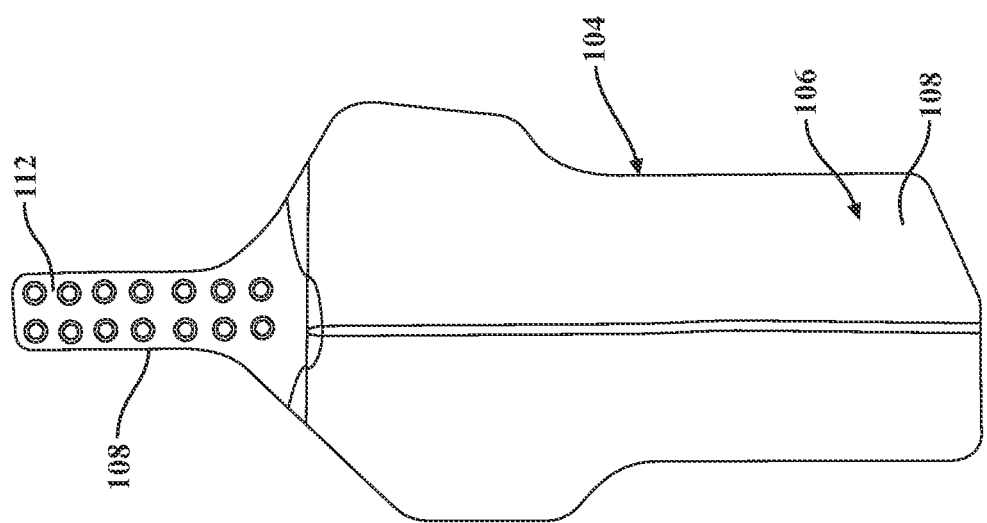
FIG. 5 is a representation of a plan view of the rearward extending splice plate represented in FIG. 2.
Figure 8:
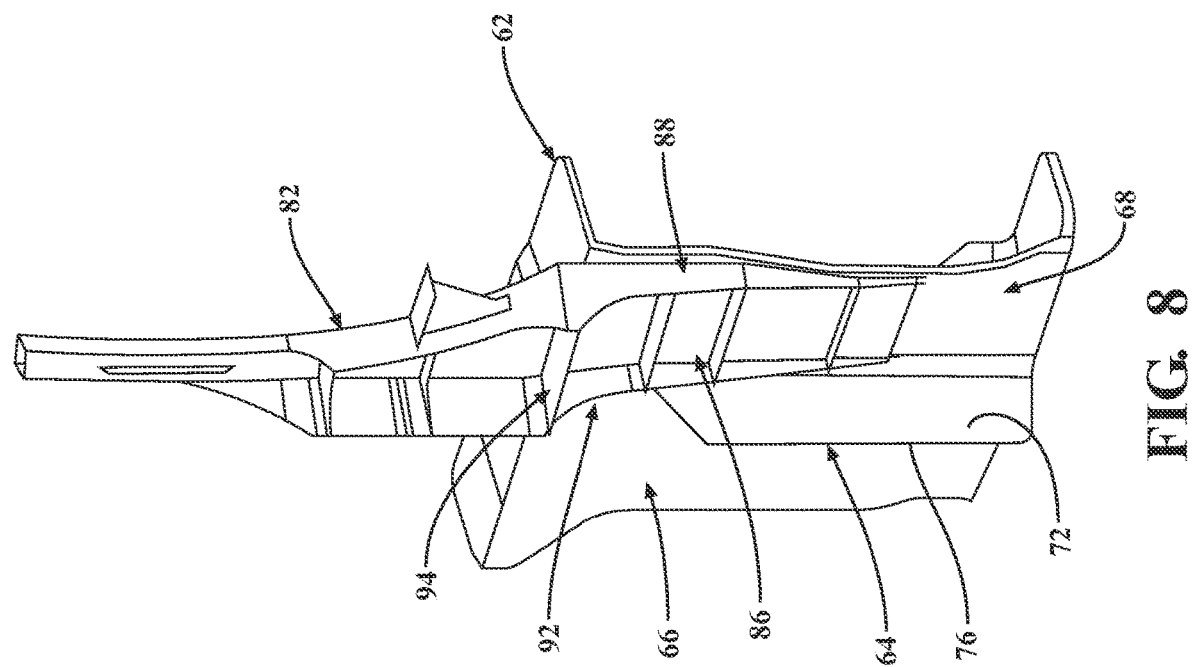
FIG. 8 is a representation of a perspective view of the rear spar side fitting and the wing rear spar terminal fitting, which are connected to the aft spar of the center wing box (not shown).

Also represented in FIGS. 2, 9 and 10 is a lower plate 104 or lower splice plate 104 connected to the inboard end of the aircraft wing 14 below the aft flange 64. FIG. 5 is a representation of a plan view of the lower splice plate 104 removed from the aircraft wing 14. The lower plate 104 is constructed as one, monolithic piece of titanium. However, other equivalent materials could be employed in constructing the lower plate 104. FIG. 5 is a representation of a plan view of the top of the lower plate 104. As represented in FIGS. 2, 5, 9 and 10, the lower plate 104 has a configuration with a wide base portion 106 and a more narrow, rearward extending portion 108 or rearward portion 108. The base portion 106 of the lower plate 104 is secured to the bottom of the aft wing spar 18 and the bottom of the terminal fitting 62. The rearward extending portion 108 of the lower plate 104 projects rearwardly from the connection of the base portion 106 to the aft wing spar 18 and the terminal fitting 62. The rearward extending portion 108 of the lower plate 104 has a top surface 112 that extends rearwardly from beneath the aft wing spar 18 and the terminal fitting 62.

Prior to assembling the aircraft wing 14 to the aircraft body 12, the trap panel 26 is connected to the fuselage 22 of the aircraft body 12 as represented in FIGS. 3, 9 and 10. The panel 26 is positioned relative to the fuselage 22 with the panel top flange surface 46 engaging against a bottom surface of the fuselage 22. An upper connection connects the panel 26 to the bottom surface of the fuselage 22 or to the bottom surface of the aircraft body 12. The upper connection is comprised of at least one upper splice plate 114, and preferably a plurality of upper splice plates 114. As represented in FIGS. 3 and 9, the upper splice plates 114 are generally thin, flat pieces of material such as a composite material or other equivalent type of material. The upper splice plates 114 represented in FIGS. 3 and 9 have general, rectangular configurations. However, the upper splice plates 114 could have other equivalent configurations that enable the upper splice plates 114 to lay flat in surface engagement against the outboard side surface 28 of the panel 26 and the outboard surface of the fuselage 22 as represented in FIGS. 3 and 9. The upper splice plates 114 are spatially positioned along the panel top surface or the panel top flange 44 and along the outboard surface of the fuselage 22. The upper splice plate or plurality of upper splice plates 114 are engaged in surface engagement with the outboard side surface 28 of the panel 26 and are connected to the panel 26 by fasteners such as nut and bolt fasteners or other equivalent types of fasteners, and the upper splice plate or plurality of upper splice plates 114 are engaged in surface engagement with the fuselage 22 of the aircraft body and are connected to the fuselage 22 by fasteners such as nut and bolt fasteners, or other equivalent types of fasteners. The upper connection provided by the upper splice plate or upper splice plates 114 connects the panel 26 to the fuselage 22 of the aircraft body 12, or connects the panel 26 to the bottom surface of the fuselage 22 of the aircraft body 12.

With the upper splice plates 114 secured to the outboard side surface 28 of the panel 26, the panel 26 has exposed surface areas 116 on the panel outboard side surface 28. The exposed surface areas 116 are adjacent the panel top flange 44 and between adjacent upper splice plates 114 of the plurality of upper splice plates. The panel exposed surfaces 116 provide means for inspection of the outboard side surface 28 of the panel 26 for signs of panel fatigue, for example panel cracks at the panel exposed surface areas 116.

In assembling the aircraft wing 14 to the aircraft body 12, the assembled aircraft wing 14 is moved toward the aircraft body 12. The root end or inboard end of the aft wing spar 16 of the aircraft wing 14 is moved toward the outboard surface of the fuselage 22 and the outboard end of the wheel well 24. The movement is continued until the root end 16 or the inboard end of the aft wing spar 16 of the aircraft wing 14 comes into contact with the outboard surface of the fuselage 22. Alternatively, the aircraft body 12 and aircraft wing 14 are aligned by moving the wing 14 inboard until an alignment criteria with the fuselage or aircraft body 12 is met (such as the terminal fitting aft flange 64 aligning with the panel forward edge surface 42).

The movement of the aircraft wing 14 to the aircraft body 12 positions the trap panel forward edge surface 42 opposing the rearward edge surface 76 of the rearward extending aft flange 64 as represented in FIGS. 9 and 10. The movement of the aircraft wing 14 to the aircraft body 12 also positions the panel bottom flange surface 52 opposing the top surface 112 of the rearward extending portion 108 of the lower splice plate 104.

Figure 12:
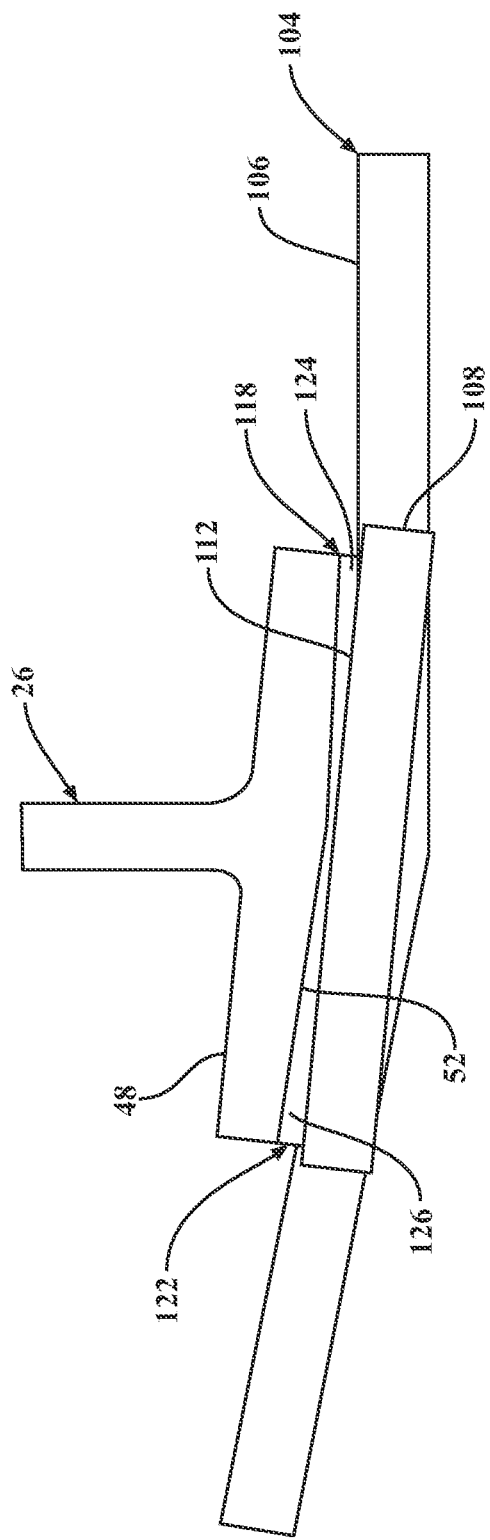
FIG. 12 is a representation of a cross-section view of the join between the panel bottom flange and the lower splice plate top surface.

There is a gap between the panel bottom flange surface 52 and the top surface 112 of the rearward extending portion 108 of the lower splice plate 104. A cross-section view of the gap is represented in FIG. 12. The gap has an inboard portion 118 of the gap and an outboard portion 122 of the gap on opposite sides of the gap. As represented in FIG. 12, the inboard portion of the gap 118 tapers as the inboard portion of the gap 118 extends into the gap. The outboard portion of the gap 122 also tapers as the outboard portion of the gap 122 extends into the gap.

With the movement of the aircraft wing 14 to the aircraft body 12 positioning the panel bottom flange surface 52 opposite the top surface 112 of the rearward extending portion 108 of the lower splice plate 104 as represented in FIGS. 9, 10, and 12, a shim is inserted into the gap between the panel bottom flange surface 52 and the top surface 112 of the rearward extending portion 108 of the lower splice plate 104. The shim is comprised of an inboard shim 124 and a separate outboard shim 126. The inboard shim 124 is inserted into the inboard portion of the gap 118 and the outboard shim 126 is inserted into the outboard portion of the gap 122. The tapered cross-section configurations of the inboard portion of the gap 118 and the outboard portion of the gap 122 facilitate the insertions of the inboard shim 124 and the outboard shim 126 into their respective gaps. After installation, there is a gap between the inboard shim 124 and the outboard shim 126 that allows a squeeze out of the fay sealant. The taper of the shims 124, 126 prevents total scraping off of the fay sealant as the shims are inserted into the gaps. The inboard shim 124 and the outboard shim 126 provide fay seals between the aluminum of the trap panel 26 and the titanium of the lower splice plate 104.

There is a forward connection connected to the panel 26 and connected to the rearward extending aft flange 64 on the aircraft wing 14. The forward connection is represented in FIGS. 9, 10 and 11. The forward connection connects the panel 26 to the rearward extending aft flange 64. The forward connection is comprised of a forward splice plate, or a plurality of forward splice plates. FIG. 9 represents a single, large forward splice plate 128 connecting the panel 26 to the rearward extending flange 64. The large forward splice plate 128 is secured to the panel outboard side surface 28 and is secured to the rearward extending flange outboard side surface 74. FIG. 10 represents a plurality of small forward splice plates 132 connecting the panel 26 to the rearward extending flange 64. The plurality of small forward splice plates 132 are secured to the panel inboard side surface 32 and are secured to the reward extending flange inboard side surface 72. It should be understood that a large splice plate 128 could replace the small splice plates 132, and that the small splice plates 132 could replace the large splice plate 128. In FIGS. 9 and 10, the forward connection splice plates 128, 132 are engaged in surface engagement with the panel 26 and are connected to the panel by fasteners, such as nut and bolt fasteners, and are engaged in surface engagement with the rearward extending aft flange 64 and are connected to the rearward extending flange 64 by fasteners, such as nut and bolt fasteners. In FIG. 10, the plurality of small splice plates 132 are spatially arranged at positions along the forward edge surface 42 of the panel 26 and are spatially arranged at positions along the rearward edge surface 76 of the rearward extending aft flange 64.

Adjacent small splice plates 132 of the plurality of forward splice plates connected to the panel inboard side surface 32 as represented in FIG. 10 leave exposed surface areas 134 on the panel inboard side surface 32 adjacent the panel forward edge surface 42. The panel exposed surface areas 134 provide means for inspection of the panel inboard side surface 32 for signs of fatigue, for example the formation of cracks at the panel exposed surface areas 134.

The assembly and method of this disclosure for connecting the aircraft wing 14 to the aircraft body 12 facilitates the building process of integrating and fitting the inboard end of the aft wing spar 16 of the aircraft wing 14 to the fuselage 22 of the aircraft body 12. The assembly provides structural strength to the connection between the aircraft wing 14 and the aircraft body 12. The assembly allows an improved load path from the aircraft wing 14 to the aircraft body 12 provided by the splice plates 98, 104, 114, 128, 132, which also reduce the overall weight of the assembly structure. The use of the splice plates 98, 104, 114, 128, 132 also enable easy inspection at critical joints between the aircraft wing 14 and the aircraft body 12. The improved joints of the assembly allow fay seal application in the gap 118, 122 between the panel bottom flange surface 52 and the lower splice plate top surface 112, providing corrosion protection.

As various modifications could be made in the construction of the assembly and method for connecting an aircraft wing to an aircraft body herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. An assembly connecting an aircraft wing to an aircraft body, the assembly comprising:
   a panel on the aircraft body, the panel having a panel forward edge, the panel forward edge having a forward edge surface;
   the panel having an inboard side surface, an outboard side surface, and a perpendicular bottom flange, wherein the bottom flange defines a panel bottom, including, in a cross-sectional view, an inboard portion of the bottom flange and an outboard portion of the bottom flange, the panel bottom having a panel bottom surface;
   the panel forward edge surface opposing a rearward edge surface of a rearward extending flange on the aircraft wing;
   the panel bottom surface opposing a top surface of a rearward extending plate on the aircraft wing;
   a forward connection connected to the panel and to the rearward extending flange and connecting the panel and the rearward extending flange;
   the forward connection comprising a forward splice plate, the forward splice plate being engaged in surface engagement with the panel and being connected to the panel;
   the forward splice plate being engaged in surface engagement with the rearward extending flange and being connected to the rearward extending flange;
   a gap between the panel bottom surface and the top surface of the rearward extending plate on the aircraft wing, wherein:
      the gap has an inboard portion of the gap between the panel bottom surface of the inboard portion of the bottom flange and an outboard portion of the gap between the panel bottom surface of the outboard portion of the bottom flange on opposite sides of the gap; and,
      in the cross-sectional view, the inboard portion of the gap tapers as the inboard portion of the gap extends into the gap and the outboard portion of the gap tapers as the outboard portion of the gap extends into the gap;
   an inboard shim inserted into the inboard portion of the gap; and,
   an outboard shim inserted into the outboard portion of the gap.

2. The assembly of claim 1, further comprising:
   the forward splice plate being one of a plurality of forward splice plates, the plurality of forward splice plates being spatially positioned along the panel forward edge surface and along the rearward edge surface of the rearward extending flange.

3. The assembly of claim 2, further comprising:
   the panel having a panel exposed surface area on the panel adjacent the panel forward edge, the panel exposed surface area being between adjacent forward splice plates of the plurality of forward splice plates spatially positioned along the panel forward edge surface;
   the rearward extending flange having a flange exposed surface area on the rearward extending flange adjacent the rearward edge surface of the rearward extending flange, the flange exposed surface area being between adjacent forward splice plates of the plurality of forward splice plates spatially positioned along the rearward edge surface of the rearward extending flange;

the panel exposed surface area providing means for inspection of the panel exposed surface area; and, the flange exposed surface area providing means for inspection of the flange exposed surface area.

4. The assembly of claim 1, further comprising:

a fitting, the fitting being connected to the rearward extending flange on the aircraft wing;

the fitting having a base, the base being vertically oriented;

the fitting having a stiffener flange, the stiffener flange extending rearwardly from a top of the base, the stiffener flange being horizontally oriented; and, an upper connection, the upper connection being connected to the stiffener and the upper connection being connected to the aircraft body.

5. The assembly of claim 4, further comprising:

the upper connection comprising an upper splice plate, the upper splice plate being connected to the stiffener and the upper splice plate being connected to the aircraft body and, the upper splice plate being connected to the stiffener and the upper splice plate being connected to a wheel well longeron of the aircraft body.

6. The assembly of claim 1, further comprising:

an up-lock fitting on the panel, the up-lock fitting being integrally formed on the panel, the up-lock fitting having means for connection of the up-lock fitting to a landing gear.

7. The assembly of claim 6, further comprising:

the panel having stiffener ribs integrally formed on the panel; and, the up-lock fitting being integrally formed into the stiffener ribs integrally formed on the panel.

8. An assembly connecting an aircraft wing to an aircraft body, the assembly comprising:

a panel, the panel having a panel forward edge, the panel forward edge having a forward edge surface;

the panel having a panel top flange, the panel top flange having a top flange surface;

the panel having a panel bottom flange arranged perpendicular to the top flange, wherein the bottom flange defines, in a cross-sectional view, an inboard portion of the bottom flange and an outboard portion of the bottom flange and has, the panel bottom flange having a bottom flange surface;

the panel forward edge surface opposing a rearward edge surface of a rearward extending flange on the aircraft wing;

the panel top flange surface opposing a bottom surface on the aircraft body;

the panel bottom flange surface opposing a top surface of a rearward extending plate on the aircraft wing, a gap between the bottom flange surface and the top surface of the rearward extending plate on the aircraft wing, wherein:

the gap has an inboard portion of the gap between the bottom flange surface of the inboard portion of the bottom flange and an outboard portion of the gap between the bottom flange surface of the outboard portion of the bottom flange on opposite sides of the gap; and, in the cross-sectional view, the inboard portion of the gap tapers as the inboard portion of the gap extends into the gap and the outboard portion of the gap tapers as the outboard portion of the gap extends into the gap;

an inboard shim inserted into the inboard portion of the gap; and, an outboard shim inserted into the outboard portion of the gap.

9. The assembly of claim 8, further comprising:

a forward connection comprising a plurality of forward splice plates, the plurality of forward splice plates being spatially positioned along the panel forward edge surface and along the rearward edge surface of the rearward extending flange and being connected to the panel and the rearward extending flange on the aircraft wing.

10. The assembly of claim 9, further comprising:

the panel having a panel side surface adjacent the panel forward edge, the plurality of forward splice plates being connected to the panel on the panel side surface, the panel having panel exposed surface areas on the panel side surface adjacent the panel forward edge and between adjacent forward splice plates of the plurality of forward splice plates, the panel exposed surface areas providing means for inspection of the panel side surface at the panel exposed surface areas.

11. The assembly of claim 10, further comprising:

the rearward extending flange having a flange side surface adjacent the rearward edge surface of the rearward extending flange, the plurality of forward splice plates being connected to the rearward extending flange on the flange side surface, the rearward extending flange having flange side surface exposed surface areas on the flange side surface adjacent the rearward extending flange rearward edge surface and between adjacent forward splice plates of the plurality of forward splice plates, the rearward extending flange exposed surface areas providing means for inspection of the flange side surface at the rearward extending flange exposed surface areas.

12. A method of assembling an aircraft wing to an aircraft body, the method comprising:

moving the aircraft wing toward the aircraft body;

positioning a panel forward edge surface of a panel on the aircraft body opposite a rearward edge surface on a rearward extending flange on the aircraft wing, wherein:

the panel has an inboard side surface, an outboard side surface, and a perpendicular bottom flange; and, the bottom flange defines a panel bottom including, in a cross-sectional view, an inboard portion of the bottom flange and an outboard portion of the bottom flange, the panel bottom having a panel bottom surface; and, positioning the panel bottom surface on the panel opposite a top surface on a rearward extending plate on the aircraft wing with there being a gap between the panel bottom surface and the top surface of the rearward extending plate on the aircraft wing, wherein:

the gap has an inboard portion of the gap between the panel bottom surface of the inboard portion of the bottom flange and an outboard portion of the gap between the panel bottom surface of the outboard portion of the bottom flange on opposite sides of the gap; and, in the cross-sectional view, the inboard portion of the gap tapers as the inboard portion of the gap extends into the gap and the outboard portion of the gap tapers as the outboard portion of the gap extends into the gap;

inserting an inboard shim into the inboard portion of the gap between the panel bottom surface and the top surface of the rearward extending plate on the aircraft wing; and, inserting an outboard shim into the outboard portion of the gap between the panel bottom surface and the top surface of the rearward extending plate on the aircraft wing.

13. The method of claim 12, further comprising:

positioning a plurality of forward splice plates at spatially arranged positions along the panel forward edge surface and along the rearward edge surface of the rearward extending flange; and, connecting the plurality of forward splice plates to the panel and to the rearward extending flange.

14. The method of claim 13, further comprising:

leaving exposed surface areas on the panel along the panel forward edge surface between adjacent forward splice plates of the plurality of forward splice plates with the exposed surface areas providing means for inspecting the panel along the panel forward edge surface.

15. The method of claim 12, further comprising:

positioning a plurality of upper splice plates at spatially arranged positions along a top of the panel and along a fuselage frame of the aircraft body; and, connecting the plurality of upper splice plates to the panel and to the fuselage frame.

* * * * *